US012672713B2

(12) United States Patent
Ogunsina et al.

(10) Patent No.: US 12,672,713 B2
(45) Date of Patent: Jul. 7, 2026

(54) TOOTHBRUSH SYSTEM

(71) Applicant: PLAYBRUSH LTD, London (GB)

(72) Inventors: Tolulope Ogunsina, London (GB); Wiktor Grajkowski, London (GB); Paul Varga, London (GB); Matthäus Ittner, London (GB)

(73) Assignee: Playbrush Ltd, London (GB)

( * ) Notice: Subject to any disclaimer, the term of this patent is extended or adjusted under 35 U.S.C. 154(b) by 609 days.

(21) Appl. No.: 18/015,586

(22) PCT Filed: Jul. 12, 2021

(86) PCT No.: PCT/GB2021/051781
§ 371 (c)(1),
(2) Date: Jan. 11, 2023

(87) PCT Pub. No.: WO2022/013534
PCT Pub. Date: Jan. 20, 2022

(65) Prior Publication Data
US 2023/0301424 A1 Sep. 28, 2023

(30) Foreign Application Priority Data
Jul. 14, 2020 (GB) ..................................... 2010856

(51) Int. Cl.
*A46B 15/00* (2006.01)
*H04B 10/116* (2013.01)
(52) U.S. Cl.
CPC ........ *A46B 15/0044* (2013.01); *H04B 10/116* (2013.01); *A46B 2200/1066* (2013.01)

(58) Field of Classification Search
CPC ........ A46B 15/0044; A46B 2200/1066; A46B 15/0008; A46B 15/0006; H04B 10/116
See application file for complete search history.

(56) References Cited

U.S. PATENT DOCUMENTS 10,064,711 B1 * 9/2018 Richter ................ A61C 17/221
11,278,384 B2 * 3/2022 Serval ................ A46B 15/0036
(Continued)

FOREIGN PATENT DOCUMENTS

CN 101454055 A 6/2009
KR 20090090829 A 8/2009
(Continued)

OTHER PUBLICATIONS

Corresponding International Patent Application No. PCT/GB2021/051781, International Search Report dated Oct. 1, 2021, 4 pages.
(Continued)

*Primary Examiner* — Eliza A Lam
(74) *Attorney, Agent, or Firm* — Cooper Legal Group LLC

(57) ABSTRACT
A toothbrush device is disclosed comprising a motion sensor for sensing motion of the device to produce motion data and a signal analysis unit for analysing the motion data to produce brushing data. A light communication module is arranged to transmit the brushing data to an external device using a light source. This can allow the brushing data to be transmitted without the need to provide a radio frequency transmission module and/or using a light source which also provides visual feedback to the user. The external device may comprise a camera arranged to produce image data, and a processor arranged to process an image of the light source to obtain the brushing data.

16 Claims, 10 Drawing Sheets

(56) References Cited

U.S. PATENT DOCUMENTS

| | | | |
|---|---|---|---|
| 2011/0275424 A1 | 11/2011 | Schmid et al. | |
| 2015/0358079 A1* | 12/2015 | Cronin | H04B 10/116 |
| | | | 398/118 |
| 2018/0020819 A1* | 1/2018 | Steckling | A46B 15/0044 |
| | | | 15/167.1 |

FOREIGN PATENT DOCUMENTS

| | | | | |
|---|---|---|---|---|
| KR | 20150080258 A | * | 7/2015 | A46B 15/0034 |
| WO | 2015187592 A1 | | 12/2015 | |

OTHER PUBLICATIONS

Corresponding International Patent Application No. PCT/GB2021/051781, Written Opinion of the International Searching Authority dated Jan. 20, 2022, 7 pages.

Corresponding Great Britain Patent Application No. GB2010856.9, Search Report dated Jan. 15, 2021, 4 pages.

Latif Ullah Kan: "Visible Light Communication: Applications, Architecture, Standardization and Research Challenges", Digital Communications and Networks (2017) 78-88, Department of Electrical Engineering, University of Engineering & Technology, Peshawar, Pakistan; https://www.sciencedirect.com/science/article/pii/S2352864816300335; Feb. 19, 2016, 11 pages.

* cited by examiner

TOOTHBRUSH SYSTEM

The present invention relates to a toothbrush device which can detect brushing motion and communicate with an external device, and a toothbrush system including such a device.

A toothbrush is an oral hygiene instrument used to clean the teeth and gums. It consists of a head of tightly clustered bristles mounted on a handle. In the case of a manual toothbrush the brushing motion is produced by the user.

An electric toothbrush is a toothbrush that causes vibrations of the bristles in the brush head in order to clean the teeth and gums. The vibrations may be linear or rotary, or a combination of the two. The vibrations are typically produced by a motor or a piezoelectric crystal powered by a battery. The battery may be rechargeable, and may be charged through inductive charging. Typically the brush head is removable so that it can be replaced when worn. In use, the user moves the toothbrush through the mouth in order to brush their teeth. Depending on the type of toothbrush and the brushing technique of the user, the movement may be from tooth to tooth, and/or may involve a brushing motion similar to that of a manual toothbrush.

In order for a user to maintain good oral health it is important that they brush their teeth correctly. To help a user brush their teeth attempts have been made to monitor how the user brushes their teeth and relay this information back to the user.

Previous attempts to monitor brushing techniques have included attaching a motion sensor to a toothbrush which monitors how the user is brushing their teeth. Often, the data from the motion sensor is sent to an application (app) or computer program, which is run on an external device e.g. a mobile phone, tablet or other portable device. The app or program then provides feedback to the user about how they have brushed their teeth.

For example, GB 2541416, the subject matter of which is incorporated herein by reference, discloses a manual toothbrush system which has an accelerometer fitted to a toothbrush holder. A processor is configured to determine the orientation of the toothbrush. The determination of the orientation may be used as inputs to control a game on an electronic computing device.

WO 2019/034854, the subject matter of which is incorporated herein by reference, discloses a device for providing an indication of brushing activity of a toothbrush. The device comprises an accelerometer configured to produce acceleration data from motion of the toothbrush. The acceleration data are processed to determine an area which is being brushed. Feedback can be provided to a user based on the determination of brushing area.

WO 2019/224555, the subject matter of which is incorporated herein by reference, discloses an electric toothbrush device with motion detection and Bluetooth Low Energy (BLE) connectivity. When operating in an online mode, acceleration data is analysed and forwarded to a mobile device. An application running on the mobile device uses this data as a control input for various types of games or teaching/coaching programs. When operating in an offline mode, brushing statistics and sensor data are saved to on board non-volatile memory for later retrieval and analysis by the mobile device application. This can allow brushing statistics and recommendations to be delivered to the user, as well as incentives to brush longer and to brush all parts of the teeth.

Existing toothbrush systems tend to use Bluetooth Low Energy (BLE) as a means of data transmission between the toothbrush device and a mobile device such as a smartphone or tablet. Most modern mobile devices are equipped with Bluetooth, and this therefore allows existing mobile devices to be used without any modification to their hardware. Bluetooth is also relatively low cost and has relatively low energy consumption in comparison to some other radio frequency transmission technologies.

However, providing a toothbrush device with wireless connectivity using Bluetooth or similar technologies means adding an extra chipset and an antenna to the device, increasing the size and price. Furthermore, it has been found that Bluetooth may be susceptible to interference from other radio frequency technologies such as Wi-Fi, which may lead to connection issues. In addition, Bluetooth modules place an additional drain on the toothbrush battery, which may reduce the amount of brushing which can take place between charges or require a larger battery to be used. A further potential problem is the relatively low data security of Bluetooth.

It would therefore be desirable to provide a toothbrush device which can reduce or overcome at least some of the problems associated with the use of Bluetooth and similar radio frequency technologies.

According to one aspect of the present invention there is provided a toothbrush device comprising:

a motion sensor for sensing motion of the device to produce motion data;

a signal analysis unit for analysing the motion data to produce brushing data;

a light source; and a light communication module for transmitting the brushing data to an external device using the light source.

The present invention may provide the advantage that, by providing a light communication module for transmitting the brushing data to an external device using the light source, it may be possible to transmit the brushing data without the need to provide a radio frequency transmission module such as Bluetooth. This may allow the toothbrush device to have a lower cost and a smaller size than if radio frequency transmission were used. Furthermore, it may be possible to transmit the brushing data with a lower energy consumption, enhanced data security and/or higher speed of data transmission, in comparison to typical radio frequency transmission technologies.

Preferably the light source is arranged to emit visible light. For example, the light source may be arranged to emit light (electromagnetic radiation) with a wavelength of between approximately 780 and 375 nm. This may allow readily available components to be used for the data transmission, and may also allow a user to be aware of when data transmission is taking place. However, the light source may be able to emit light containing at least some components outside of this range, such as in the infrared or ultraviolet part of the electromagnetic spectrum, as well or instead.

Preferably the light source comprises at least one LED (light emitting diode). For example, the light source may comprise at least one tri-colour LED. This may facilitate the use of a colour modulation scheme such as colour shift keying (CSK) using a readily available and inexpensive component. Alternatively, a plurality of different coloured individual LEDs could be used. Furthermore, any other light source capably of being suitably modulated could be used instead of LEDs.

Preferably the light communication module is a visible light communication module. The visible light communication module may be arranged to transmit data by modulating a visible light source, such as an LED. For example, the light communication module may be arranged to modulate the intensity and/or chromaticity of the light source in order to transmit the data.

In a preferred embodiment the light communication module is arranged to modulate the light source using colour shift keying (CSK). For example, colour shift keying may be used to convert data bits into physical symbols, such as LED colours/blinks. This may allow a relatively high data rate to be achieved with low energy and cost-effective components.

Preferably the light communication module is arranged to map data bits to colours in a predefined colour constellation in a chromaticity space (such as the CIE 1931 chromaticity space). The number of colours in the colour constellation may be for example, 2, 4, 8 or some other number (for example, a higher power of 2). In general, a higher number of colours (symbols) increases the data rate, but makes the system more prone to decoding errors. Thus, the number of colours used may be chosen to strike a balance between the two.

The device may be arranged to transmit calibration data containing the colours in the colour constellation. For example, a calibration packet containing the colours in the colour constellation may be transmitted, or a data packet may have a calibration field containing the colours in the colour constellation. This may help the receiver to correctly distinguish received symbols. For example, the colour perceived by the receiver may vary depending on the device used and/or changes in ambient lighting. Thus, one or more calibration packets may be sent (for example, periodically) to help compensate for such variations.

Preferably the signal analysis unit is arranged to analyse the motion data to produce data indicating an area of the mouth being brushed. This may be achieved, for example, using the techniques disclosed in WO 2019/034854. This may allow the user to be provided with information about the areas of the mouth which have been and/or are being brushed. Such information may be provided, for example, using the brushing device itself during brushing and/or using the external device after brushing.

The signal analysis unit may be arranged to produce a summary of brushing activity during a brushing session. In this case, the summary of brushing activity may be transmitted as the brushing data. This may reduce storage requirements, may allow a larger number of brushing sessions to be stored on the device, and may reduce the amount of data that needs to be transmitted. For example, the summary of brushing activity may comprise an indication of time spent brushing each area of the mouth, for example, in the form of a brushing report. The summary of brushing activity may also comprise other data, such as brushing pressure, as well or instead.

The summary of brushing activity may include a time stamp indicating a time of brushing. This may facilitate the storage of a user's brushing history, for example, on the external device or in the cloud, and may help to provide the user with appropriate information about their brushing history.

Preferably the toothbrush device comprises a memory and the brushing data are stored in the memory. For example, the summary of brushing activity may be stored in the memory. This may allow the device to transmit brushing data stored in the memory after completion of a brushing session.

Preferably the device is arranged to detect an input from the user indicating that brushing data should be transmitted, and to transmit the brushing data (for example, the brushing data stored in memory) to the external device on detection of the input. For example, the toothbrush device may be provided with a button, such as an on/off button. In this case the device may be arranged to detect when the button has been pressed for longer than a predetermined amount of time (for example, 3 or 5 seconds) and to transmit the data when this is detected.

As well as being used for data transmission, the toothbrush device may be arranged to illuminate the light source to provide visual feedback to the user. For example, the light source may provide visual feedback regarding brushing activity and/or one or more other aspects of operation such as whether the device is switched on, needs charging or is being charged. As one example, the light source may indicate an area of the mouth which is being or has been brushed and/or an amount of brushing (in total or in a particular area) and/or brushing pressure (instantaneous or accumulated; overall or in a particular area).

In one embodiment, the toothbrush device comprises a plurality of light sources each of which corresponds to an area of the mouth, and each light source is arranged to provide feedback to the user regarding brushing activity in the corresponding area. For example, the light sources (such as LEDs) may be arranged in a ring divided into four sectors, or any other number of sectors. In this case, the device may be arranged to illuminate a light source when the corresponding area of the mouth has been brushed for a predetermined amount of time. The predetermined amount of time may be for example a threshold which is stored in memory and may be fixed or variable (for example, programmable by the user or a dental health professional).

The amount of time spent brushing each area may be accumulated over time, and the corresponding light source may be illuminated when the accumulated amount of time for that area exceeds the threshold. This can allow different brushing patterns to be taken into account, since users do not always brush each area of the mouth sequentially.

Alternatively or in addition, the light sources may be arranged to display an indication of brushing pressure, for example, in the manner described in co-pending patent application number GB 1912787.7, the subject matter of which is incorporated herein by reference. In this context, the term "brushing pressure" is preferably used in its general sense to indicate a force exerted on the toothbrush head while brushing.

Thus, the device may be arranged to use the light source to provide visual feedback to the user regarding brushing activity during brushing, and to use the same light source to transmit the brushing data to the external device after brushing. This may allow at least some of the same components to be used for feedback and data transmission, thereby further reducing size and cost. For example, where the toothbrush device comprises a plurality of light sources each of which provides feedback regarding brushing activity in a corresponding area of the mouth, one or more of those light sources could also be used to transmit the brushing data. In this case, two or more light sources could transmit the same brushing data and/or two or more light sources could transmit different data, using for example space division multiplexing. Alternatively, or in addition, one or more separate LEDs, such as a tri-colour LED, could be used for the data transmission.

In one embodiment, the light communication module is arranged to inject white light into data to be transmitted to reduce the appearance of flickering. This may be achieved, for example, by injecting "white" symbols (i.e. symbols which give the appearance of white light when transmitted)

into the data to be transmitted at the appropriate times. The "white" symbols may be removed by the receiver before demodulation.

The motion detector may be for example an accelerometer configured to produce acceleration data from motion of the toothbrush, although other types of motion detector could be used instead.

The signal analysis unit may comprise means for producing, from the motion data, estimates of brushing dynamics and estimates of average acceleration, and means for producing an indication of an area of the mouth being brushed based on the estimates of brushing dynamics and the estimates of average acceleration. For example, the signal analysis unit may be as disclosed in WO 2019/034854 and/or WO 2019/224555, the subject matters of which are incorporated herein by reference. This may help to produce an accurate indication of the area of the mouth being brushed.

A corresponding external processing device may also be provided. Thus, according to another aspect of the invention, there is provided a mobile processing device comprising:

a camera arranged to produce image data; and a processor arranged to process the image data, wherein the processor is arranged to process an image of the light source of a toothbrush device in any of the forms described above to obtain the brushing data.

This aspect of the invention may provide the advantage that an existing processing device with a camera can be used to receive the transmitted data, without the need to provide the device with additional hardware.

The mobile processing device may be, for example, a mobile phone, tablet, laptop, personal computer, or any other suitable mobile device with a camera and a processor. The device may be provided with an application (software) running on the processor, which application may be arranged to access image data from the camera and to process the image data to obtain the brushing data.

The processor may be arranged to map colours in the image data to colours in a predefined colour constellation to detect transmitted data. In this case, the processor may be arranged to map the colours using the colours transmitted in calibration data such as a calibration packet. This may help to compensate for different or varying camera filters and/or variations in ambient light.

The processor may be arranged to identify an area of interest containing the image of the light source in the image data. This may help with efficient retrieval of the data.

The mobile processing device may be arranged to transmit the brushing data to a backend server. This may allow further processing to take place, and/or the data to be backed up. The mobile device may also be arranged to receive information from the backend server. This may allow additional processing to be carried out and/or additional information or updates to be provided to the user.

Preferably the mobile processing device is arranged to provide the user with information regarding their brushing activity, for example, using a display on the device. For example, the device may be arranged to display a representation of the mouth with different parts illuminated in colours which indicate brushing times and/or brushing pressures. This may help to provide the user with insights into their brushing behaviour.

According to another aspect of the invention there is provided a toothbrush system comprising a toothbrush device and a mobile processing device in any of the forms described above. The system may further comprise a backend server and/or database.

Corresponding methods may also be provided. Thus, according to another aspect of the invention, there is provided a method of analysing brushing activity carried out with a toothbrush device, the method comprising:

sensing motion of the toothbrush device to produce motion data;

analysing the motion data to produce brushing data; and modulating a light source with the brushing data, thereby to transmit the brushing data to an external device.

The method may further comprise using a mobile processing device with a camera to produce an image of the light source, and processing the image to obtain the brushing data.

Features of one aspect of the invention may be used with any other aspect. Any of the apparatus features may be provided as method features and vice versa.

Preferred features of the present invention will now be described, purely by way of example, with reference to the accompanying drawings, in which.

Figure 1:
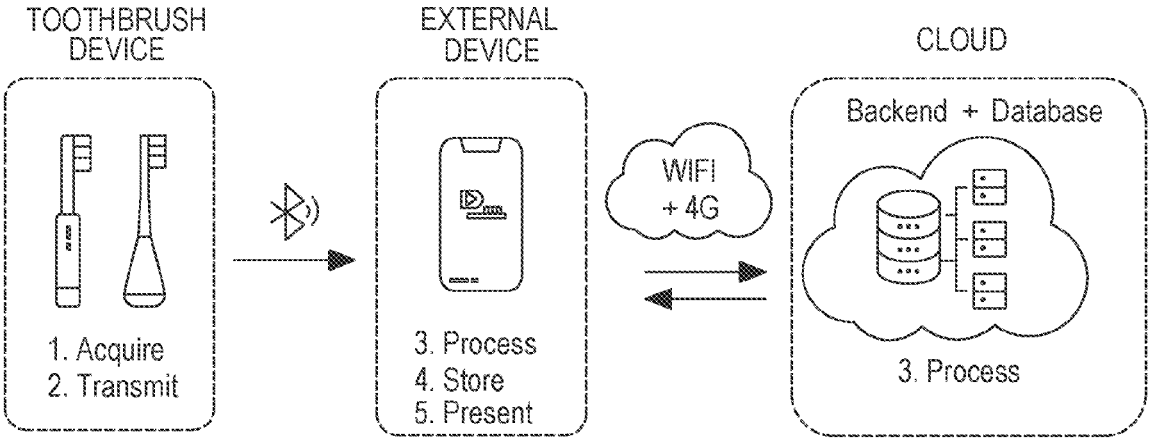
FIG. 1 illustrates the concept of a smart toothbrush system.

FIG. 1 illustrates the concept of a smart toothbrush system. Referring to FIG. 1, the system comprises a toothbrush device, an external processing device, a backend processor, and a database. The toothbrush device is in the form of an electric toothbrush or an attachment to a manual or electric toothbrush. The external device is typically in the form of a mobile phone, tablet, laptop or similar portable computing device. The backend processor and the database are typically implemented using a server and storage device located at a remote location in the cloud.

In the arrangement of FIG. 1, the toothbrush device has the ability to acquire toothbrushing data, potentially perform some initial data processing, and then transfer the data to the external device. The external device may perform further data processing and/or pass the data on to the backend processor. Aggregated data can be processed to extract useful information which can be presented to the user on the external device.

Systems such as that shown in FIG. 1 can typically operate in either online or offline mode. In online mode, the toothbrush device is connected to an external device (such as a mobile phone), for example, using Bluetooth Low Energy. In this case, brushing times and data captured during brushing can be transferred directly to the external device. The external device can then run the algorithms for detecting the mouth regions which are being brushed.

On the other hand, offline mode allows use of the toothbrush without it being connected to an external device, which may be more convenient for the user. In this case, brushing times and data captured during toothbrushing may be stored on the toothbrush device. The data stored can then be transferred via BLE to a mobile device and to the cloud for further processing and long-term storage. However, a drawback of this approach is the size of storage needed on the toothbrush device and the transmission limits of the BLE protocol.

In connected toothbrush systems such as that shown in FIG. 1, Bluetooth Low Energy (BLE) is usually used for communication between the toothbrush device and the external device. Bluetooth is a wireless technology standard used for exchanging data between devices over short distances. Most modern mobile devices are equipped with Bluetooth, which therefore provides a readily available means of communication. Bluetooth is also relatively low cost and has relatively low energy consumption in comparison to some other radio frequency transmission technologies. However, providing wireless connectivity with BLE or similar technologies means adding an extra chipset and an antenna to the toothbrush device, increasing the object size and price.

Figure 2:
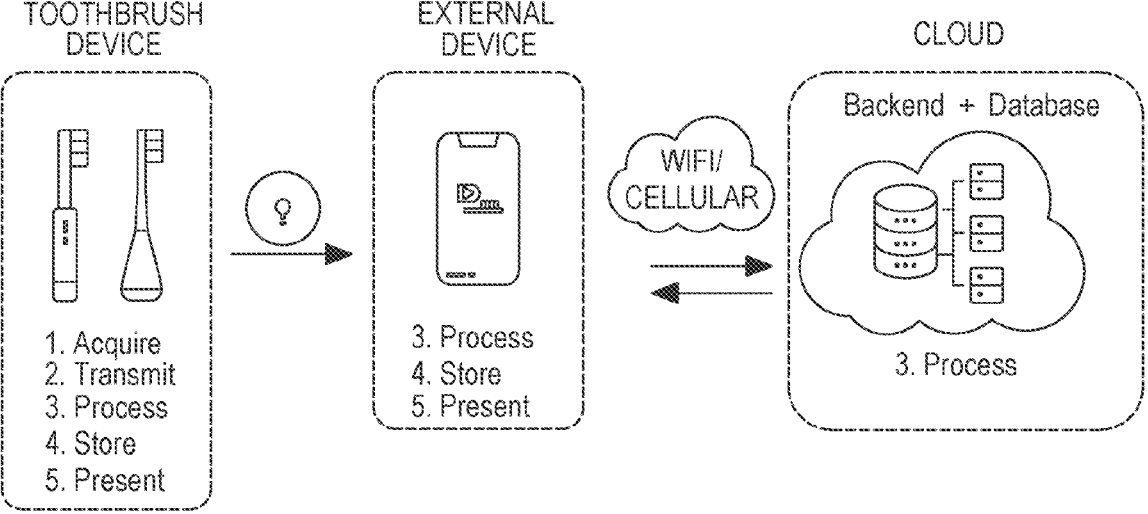
FIG. 2 shows parts of a toothbrush system in an embodiment of the invention.

FIG. 2 shows parts of a toothbrush system in an embodiment of the invention. Referring to FIG. 2, the system comprises a toothbrush device, an external processing device, a backend processor and a database, in a similarly way to the system of FIG. 1. However, in the system of FIG. 2, the toothbrush device has the ability to acquire brushing data, to process the brushing data, to store the processed data, and to present information to the user. Furthermore, the toothbrush device is arranged to transfer the brushing data to the external device using visible light. This may help to overcome some of the disadvantages associated with using radio frequency transmission such as BLE.

In the system of FIG. 2, the algorithms for detecting the mouth regions which are being brushed are transferred from the external device to the toothbrush device itself. This can allow the toothbrush device to know which parts of the mouth are being brushed. As a consequence, rather than storing raw sensor data, it is possible to store the teeth segment being brushed at every time interval, together with their timestamps. This abbreviated data (compared to raw sensor data) can allow more brushing sessions to be stored and allow the brushing data to be transferred more quickly to the external device.

Another advantage of transferring the brushing algorithms from the external device to the toothbrush device is that real time brushing feedback can be displayed directly on the toothbrush.

Many electric toothbrushes give feedback to the user, for example, by momentarily stopping the motor when the toothbrush has been in use for a specific amount of time (e.g. 30 seconds). The problem with this kind of feedback is that it assumes that a user has been brushing only one region of the mouth for that period of time, with the feedback serving as a reminder to switch sides or regions. In fact, most users brush their teeth less methodically and do not focus on only one region of the mouth for a specific amount of time.

Figure 3:
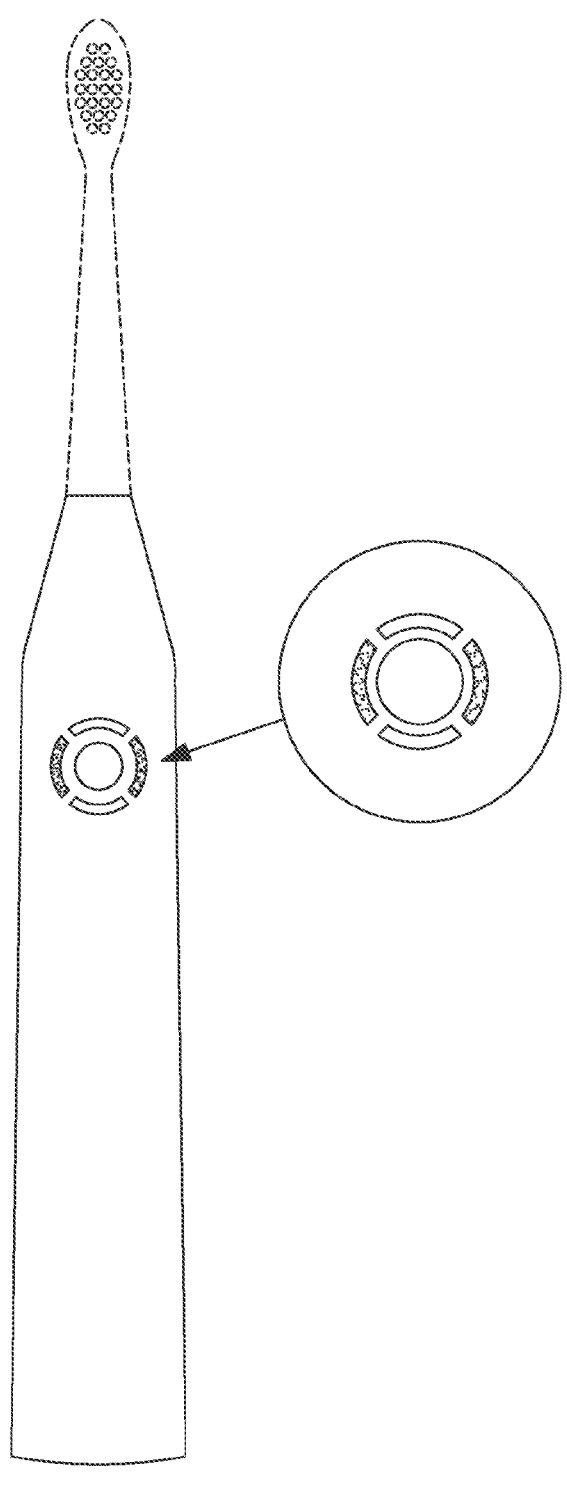
FIG. 3 shows an example of a toothbrush device with a light ring.

In a preferred embodiment, the above problem is addressed by implementing a visual feedback system directly on the toothbrush using a light ring. FIG. 3 shows an example of a toothbrush device with such a light ring. Referring to FIG. 3, the toothbrush comprises a plurality of LEDs (light emitting diodes) arranged in a light ring. The light ring is segmented into four quadrants each of which represents a region of the mouth (top, left, bottom, right). Each quadrant is illuminated when the corresponding brush region has been brushed for a specified amount of time (e.g. 30 seconds). This allows the toothbrush to present contextual information (time and direction) to the user rather than assume that the user brushes in a methodical manner, which is not usually the case. This type of feedback is possible due to the fact that the algorithm for producing the brushing data is present on the toothbrush device itself.

In one embodiment, the LEDs are multi-colour LEDs, such as tri-colour LEDs. Tri-colour LEDs contain three differently coloured (typically red, green and blue) LED emitters in one package. Use of multi-colour LEDs can allow different colours to be displayed depending on the state of brushing. For example, a traffic light system could be used, with red indicating insufficient brushing in a particular area, amber indicating nearly enough brushing, and green indicating enough brushing in that area. Use of multi-colour LEDs may also facilitate the transmission of data using visible light, as will be discussed below.

Alternatively or in addition, the LEDs could be used to display different colours in order to represent different pressures, for example as described in GB 1912787.7.

Figure 4:
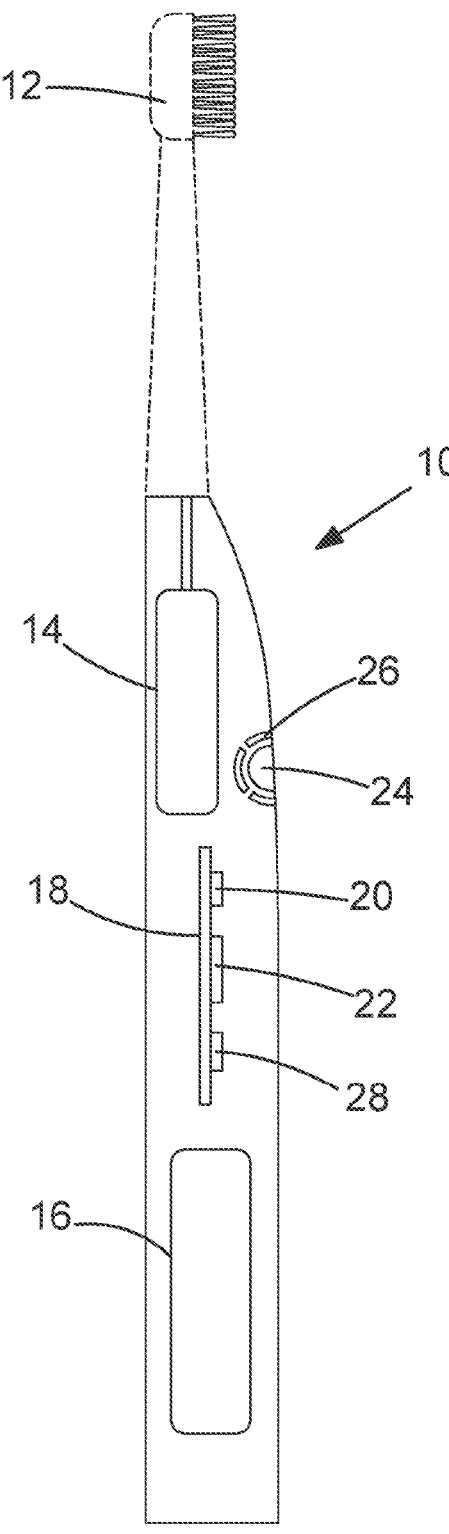
FIG. 4 shows parts of a toothbrush device in an embodiment of the invention.

FIG. 4 shows in more detail parts of a toothbrush device in an embodiment of the invention. Referring to FIG. 4, the toothbrush device 10 is in the form of an electric toothbrush attached to a removable toothbrush head 12. The toothbrush device 10 comprises a housing which accommodates a brushing motor 14, a rechargeable battery 16, and a circuit board 18. An acceleration sensor 20, a processor 22 and a memory chip 28 are provided on the circuit board 18, together with other components used for operating the toothbrush device. A button 24 is provided to turn the device on and off and to adjust the settings. In addition, a ring of LEDs 26 is provided.

In operation, the battery 16 supplies power to the brushing motor 14 to cause vibration of the toothbrush head 12. The acceleration sensor 20 is used to sense motion of the toothbrush device and to produce acceleration data. The acceleration data are processed by the processor 22 in order to estimate which part of the teeth the user is brushing. Brushing data are stored in the memory 28. The LEDs 26 are used to provide feedback to the user regarding their brushing, in the manner described above with reference to FIG. 3.

As an alternative, the toothbrush device could be in the form of an attachment to either a manual or an electric toothbrush. For example, the toothbrush device could be in the form of a toothbrush holder such as that disclosed in GB 2541416.

In this case, the circuit board 18 and the LEDs 26 may be provided in the attachment, rather than in the toothbrush itself.

Figure 5:
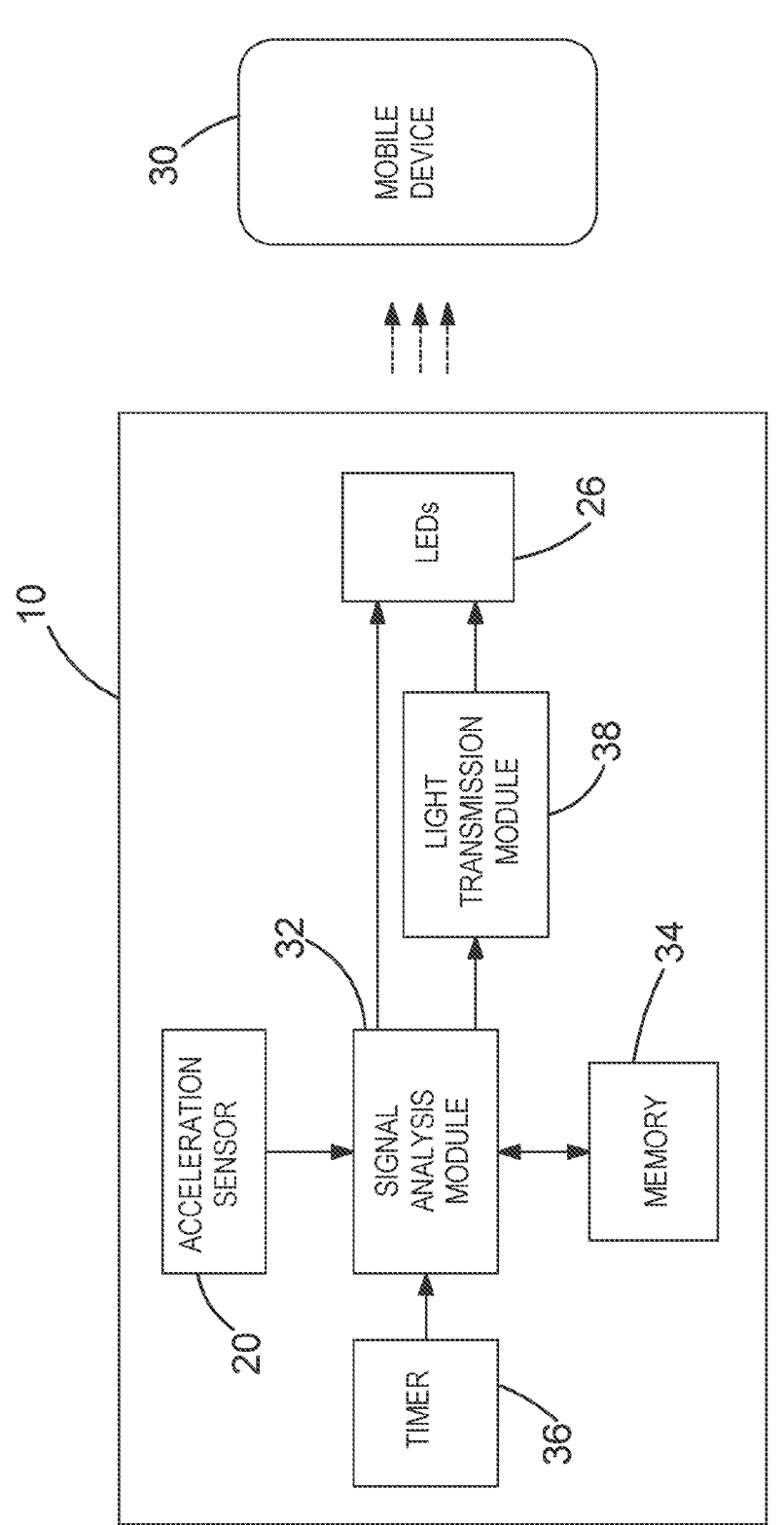
FIG. 5 is a diagram showing key components of the toothbrush system.

FIG. 5 is a block diagram showing key components of the toothbrush system. Referring to FIG. 5, the toothbrush system comprises toothbrush device 10 and mobile device 30. The toothbrush device 10 may in the form of an electric toothbrush as shown in FIG. 4, or an attachment to a manual or electric toothbrush. The toothbrush device comprises acceleration sensor 20, signal analysis module 32, memory 34, timer 36, light transmission module 38 and LEDs 26. The signal analysis module 32 and/or the light transmission module 38 may be at least partially implemented using software running on the processor 22 of FIG. 4. The memory 34 may provided by the memory chip 28 of FIG. 4.

In operation, as the user brushes their teeth, the acceleration sensor 20 collects acceleration data caused by movement of the toothbrush. The signal analysis module 32 performs signal processing on the acceleration data, in order to identify the part of the mouth being brushed and to produce brushing data. The brushing data are stored in the memory 34. The timer 36 is used to time the brushing session. During brushing, the LEDs 26 are used to provide feedback to the user regarding their brushing, in the manner described above with reference to FIG. 3. Once a brushing session is complete, the light transmission module 38 is used to transmit brushing data from the toothbrush device 10 to the mobile device 30, as will be discussed below. An application running on the mobile device is used to extract useful information and to present it to the user.

Figure 6:
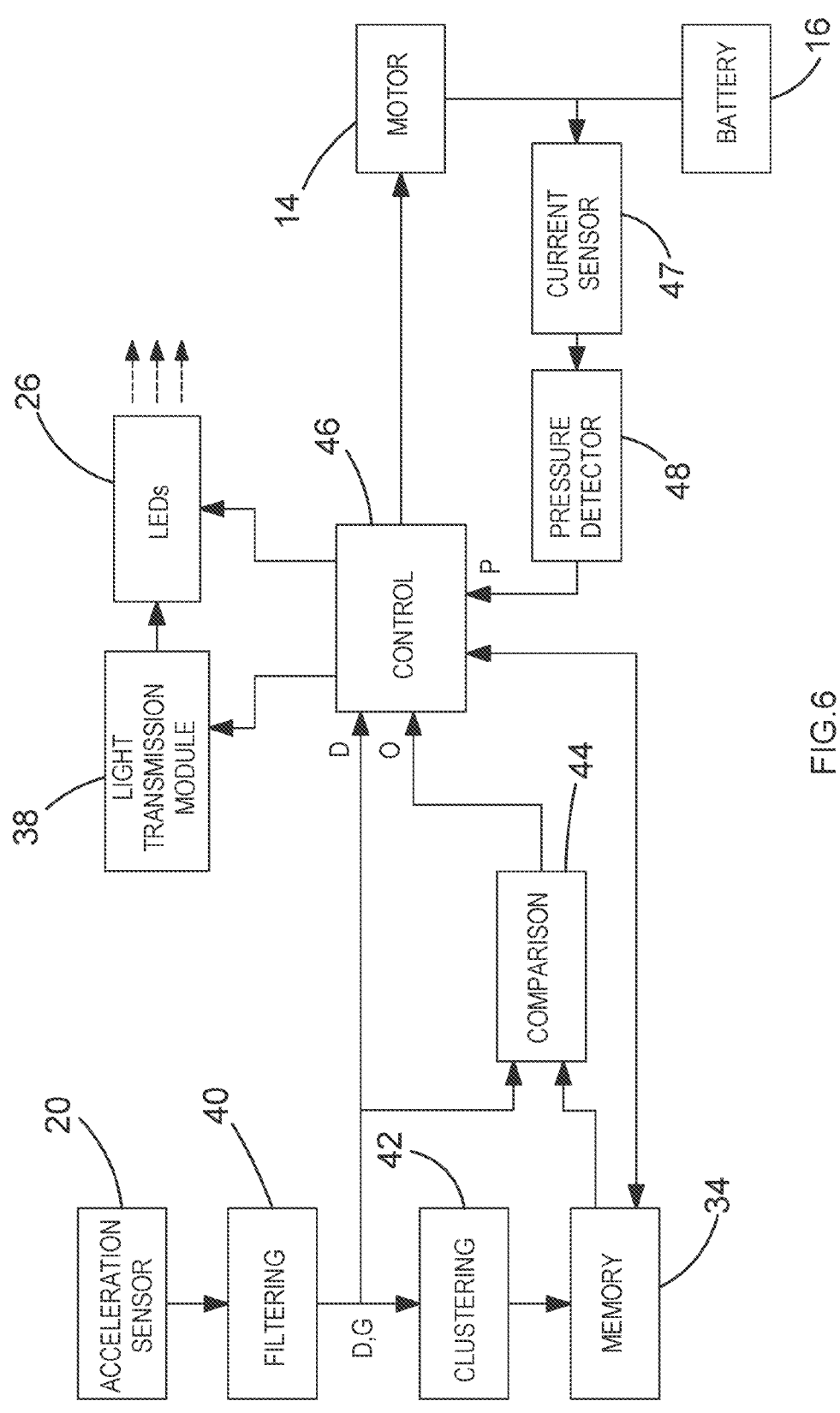
FIG. 6 shows parts of the toothbrush device which are used for producing brushing data.

FIG. 6 shows in more detail parts of the toothbrush device which are used for producing and transmitting brushing data. Referring to FIG. 6, the device comprises acceleration sensor 20, filtering module 40, clustering module 42, memory 34, comparison module 44, control module 46, current sensor 47 and pressure detector 48 as well as light transmission module 38, LEDs 26, motor 14 and battery 16. The filtering module 40, clustering module 42, comparison module 44, control module 46 and pressure detector 48 may be part of the signal analysis module 28 of FIG. 5.

In operation, the acceleration sensor 20 collects acceleration data caused by movement of the toothbrush. The acceleration data are passed to the filtering module 40. The filtering module 40 filters the acceleration data to provide an estimate of the brushing dynamics D, and a moving average value of the acceleration G. The output of the filtering module 40 is fed to the clustering module 42. The clustering module 42 performs a clustering process on the data received from the filtering module 40. The clustering module 42 produces clustering results which are passed to the memory 34 for storage.

The filtering module 40 and the memory 34 are both connected to the comparison module 44. The comparison module 44 receives the brushing dynamics D and the moving average value of the acceleration G from the filtering module 40, and stored clustering results from the memory 34. The comparison module 44 compares the data from the filtering module 40 with the clustering results from the memory 34. The result of the comparison is an orientation signal O, which provides an indication of which area of the mouth the user is brushing. The comparison module 44 passes the orientation signal O to the control module 46. The control module 46 provides feedback to the user regarding their brushing, based on the orientation signal O. This may be done by controlling the speed of the motor 14 and/or controlling the LEDs 26.

The control module 40 also receives the estimate of the brushing dynamics D from the filtering module 34. The control module 40 is also able to provide feedback and control based on the value of the brushing dynamics D.

The battery 16 supplies current to the motor 14, in order to produce vibration of the toothbrush head. The amount of current drawn by the motor 14 from the battery 16 is measured by the current sensor 47. The sensed current is passed to the pressure detector 48. The pressure detector 48 produces a pressure signal P based on the sensed current. The pressure signal P may also be used by the control module 46 to control vibration of the toothbrush head and/or to provide feedback to the user.

The filtering module 40, clustering module 42, memory 34, comparison module 44, control module 46, current sensor 47 and pressure detector 48 may be, for example, as described in International patent publication numbers WO 2019/034854 A1 and WO 2019/224551 A1 in the name of the present applicant, the subject matters of both of which are incorporated herein by reference.

Referring back to FIG. 5, the signal analysis module 32 is used to generate brushing data produced during a brushing session. These brushing data are stored in the memory 34. After each brushing session, the signal analysis module 32 generates a brushing report which is stored in memory 34 for later retrieval. The brushing report contains information such as the time the user spent brushing each part of the mouth and for how long the user applied too much pressure, potentially also separated into each part of the mouth. Each brushing session is timestamped using the timer 36. In order to be able to correctly timestamp the session without the need for bidirectional communication, an additional time reference (for example, from device boot or last synchronisation or memory clear event) may be included in the data. Additionally, it is useful to be able to identify the device by a unique ID.

To further improve the speed of transmission of brushing data and the amount of data that can be collected on the device, brushing session summarization can be used, which allows the brushing sessions to be summarized according to the position brushed. In this case, rather than storing the position of the brush at each interval, a brushing summary is stored with each direction/segment having a corresponding duration. In this new format a brushing session can be summarized as [t, L, R, U, D] where:

t=brushing time which is stored as an offset from a reference time;

L=a value representing the amount of time spent brushing Left;

R=a value representing the amount of time spent brushing Right;

U=a value representing the amount of time spent brushing Up; and

D=a value representing the amount of time spent brushing Down.

Thus, in this example, a brushing report comprising approximately 20 bytes of data can be stored for each brushing session. However, it will be appreciated that other data, such as brushing pressure values, could be stored as well or instead, and that the size of the brushing report may vary accordingly.

The brushing session summarization increases the speed of transfer and increases the number of brushing sessions that can be stored directly on the toothbrush.

After the toothbrush device has been used, there will be one or more timestamped brushing reports stored in the memory 34. When the user wishes to upload these brushing reports to the mobile device 30, they may initiate transmission, for example, by pushing and holding the "ON" button 24 for more than a predetermined period of time (for example, 5 seconds). The brushing reports are then retrieved from memory and transmitted to the mobile device 30 using the light transmission module 38 and LEDs 26. The device ID and a header are transmitted along with the brushing reports. The header contains the time reference, and may additionally include other fields, such as brushing mode or data length. An additional checksum computed over the entire data (including header) is appended at the end to allow an end-to-end integrity check.

Figure 7:
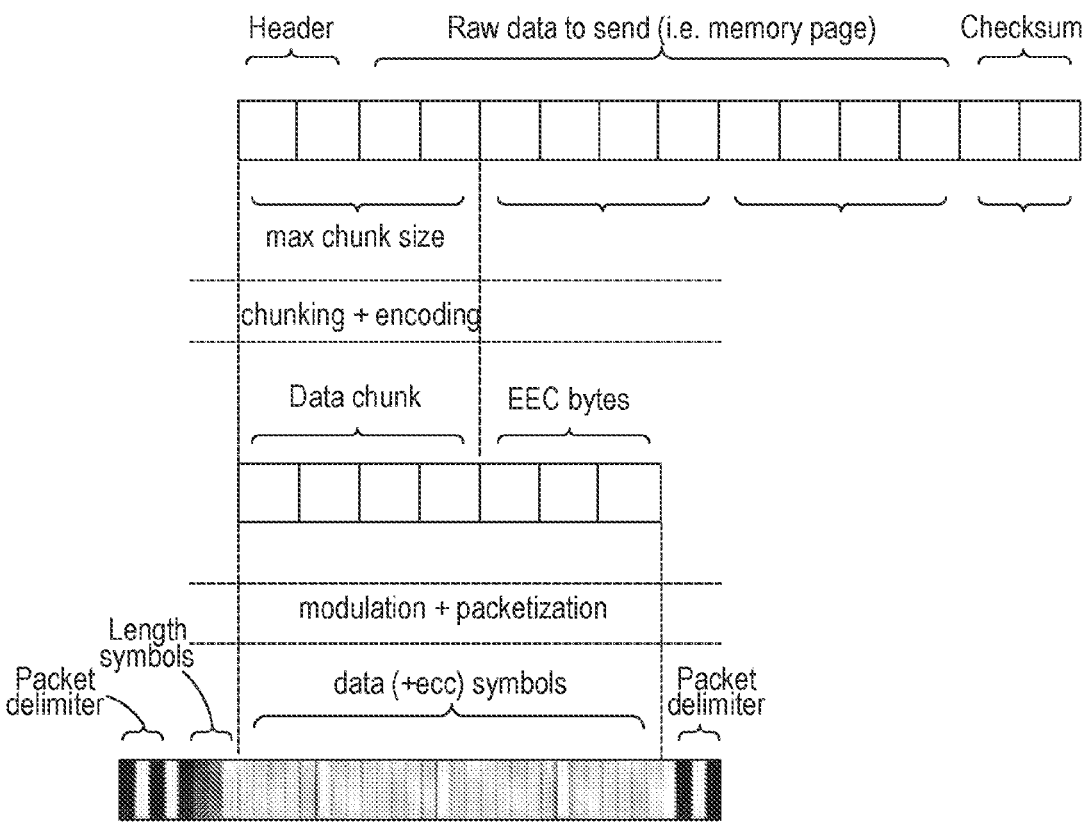
FIG. 7 illustrates how data can be chunked, encoded, packetized and modulated prior to transmission.

In order to correctly transfer the data from the toothbrush device to the mobile device, the header, the brushing report data (referred to here as the raw data bits) and checksum are first chunked, then encoded, then packetized (encapsulated in a transmission protocol) and then modulated. This process is illustrated in FIG. 7. The process is carried out by the light transmission module 38.

The maximum chunk size is chosen such that the entire packet fits within at most two consecutive camera frames. This is because when utilising the rolling shutter effect to transmit multiple symbols per frame, some symbols are lost due to an inter-frame gap. With only one gap per packet, the correct number of 'placeholder' symbols can be artificially injected in place of the lost symbols by the receiver so that the original data can be reconstructed successfully using a Reed-Solomon decoder. The exact chunk size will depend on the symbol rate, number of ECC bytes used, receiver camera parameters and rate of anti-flicker white symbols injection.

Figure 8:
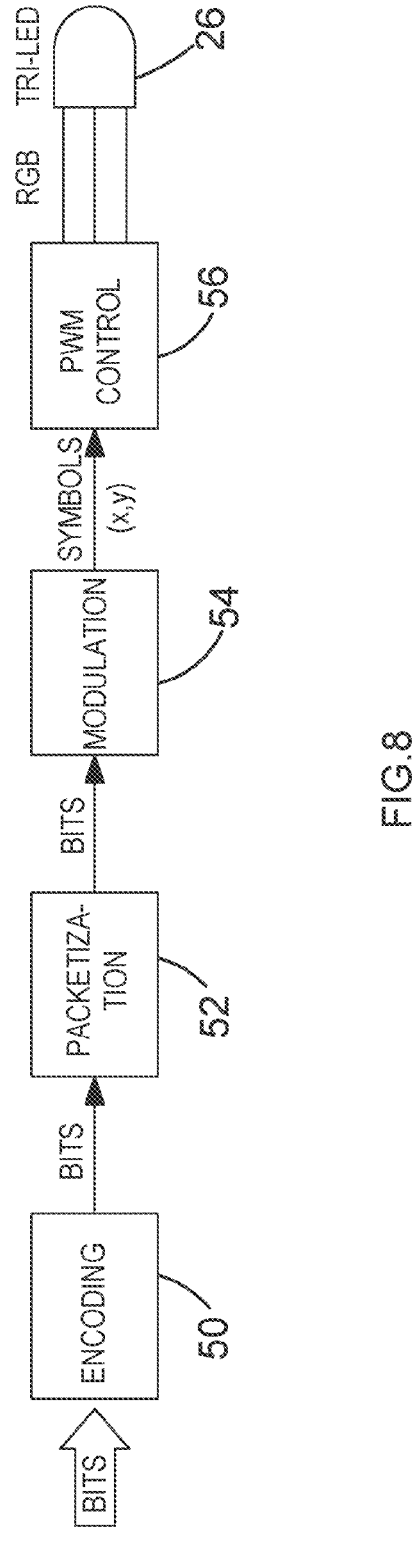
FIG. 8 shows parts of a light transmission module.

FIG. 8 shows parts of the light transmission module 38 in one embodiment. Referring to FIG. 8, the light transmission module comprises encoding module 50, packetization module 52, modulation module 54 and PWM (pulse width modulation) control module 56.

In operation, the encoding module 50 receives the raw data bits from the signal analysis module 32. The encoding module 50 is used to chunk and encode the raw data bits and to introduce redundancy. There will be a certain amount of data loss in the system and this step allows lost bits to be recovered. Error correction codes, such as Reed-Solomon codes, may be used for error correction. The encoded data is sent from the encoding module 50 to the packetization module 52.

The packetization module 52 is used to bundle the encoded data into packets. This further increases the system's resistance to corruption by processing the data in packets with clear start and end points. Each packet consists of a packet header, data and a delimiter. The packet header consists of a packet flag (indicating the type of packet, such as a data or a calibration packet) and packet size. The encoded data (including parity bits from error correction coding) follows. The packet is terminated by packet delimiter symbols. The data packets are sent from the packetization module 52 to the modulation module 54.

The modulation module 54 is used to convert the bits in the data packets into symbols for transmission by the LED. In this embodiment the modulation scheme used is Colour Shift Keying (CSK). CSK modulates the chromaticity of the visible light emitted by multicolour LEDs for data transmission. To achieve this, the modulation module 54 maps the packetized bits onto one of 4 or 8 colours (representing 2 or 3 bits) from a colour constellation in a colour space (for example, the CIE 1931 colour space defined by the International Commission on Illumination). The output of the modulation module 54 is thus a series of chromaticity values corresponding to the data symbols. These values are sent to the PWM control module 56.

The PWM control module 56 coverts the chromaticity values from the modulation module into RGB (red, green, blue) signals for driving the tri-colour LED 26. The varying chromaticity values are achieved by varying the intensities of each of the RGB LEDs in the tri-colour LED. This is achieved by varying the time for which each LED is turned on (versus being turned off) in every PWM period. The output of the tri-colour LED is thus a series (in time) of different colours corresponding to the data symbols.

Figure 9A:
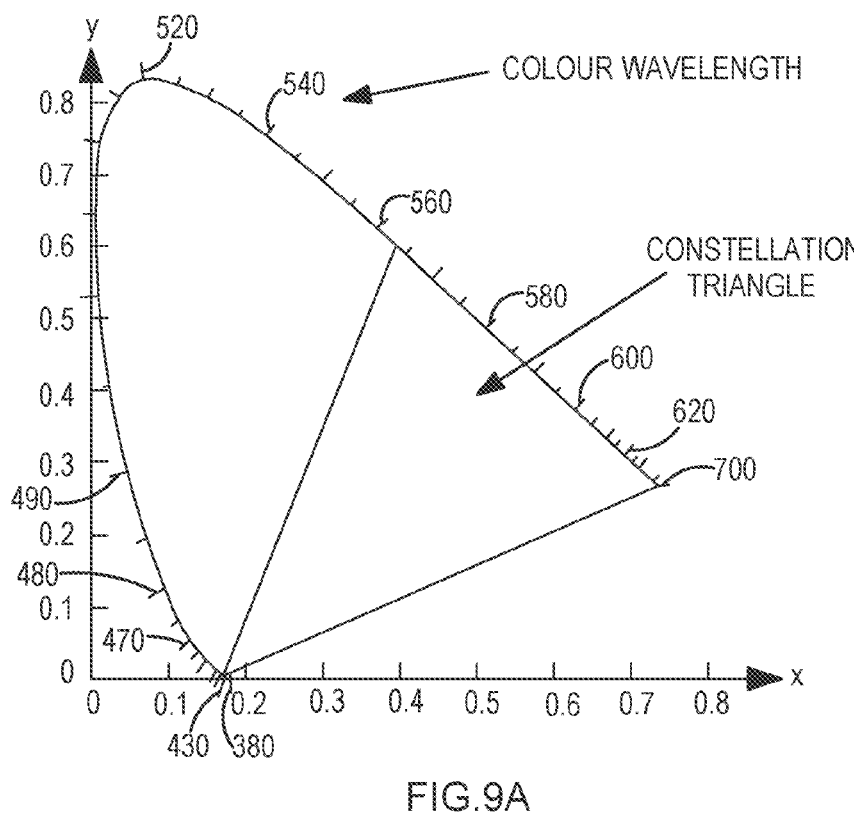
FIGS. 9A and 9B show a representation of a colour space and an example of possible constellation symbols.
Figure 9B:
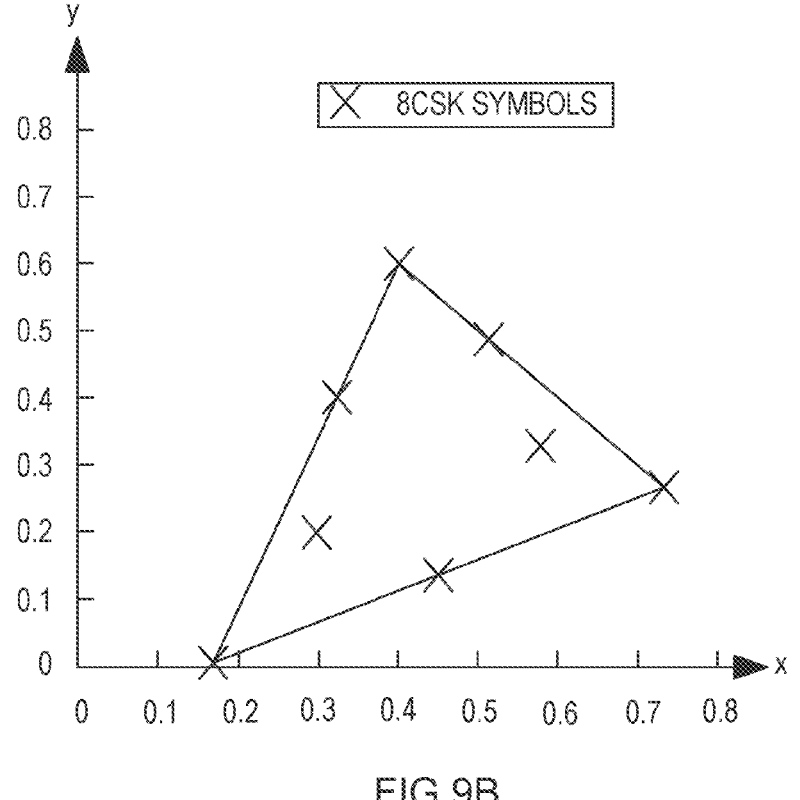

FIG. 9A is a monochromatic representation of the CIE 1931 colour space. The outer curved boundary shows the colour wavelengths in nanometres. In FIG. 9A a constellation triangle is shown which is used to define constellation symbols. FIG. 9B shows an example of possible constellation symbols. The constellation symbols are chosen such that inter-symbol distance is maximized for reduced inter-symbol interference. A higher number of symbols increases the data rate but makes the system more prone to decoding errors. Therefore, the number of symbols used is chosen as a balance between the two.

Figure 10:
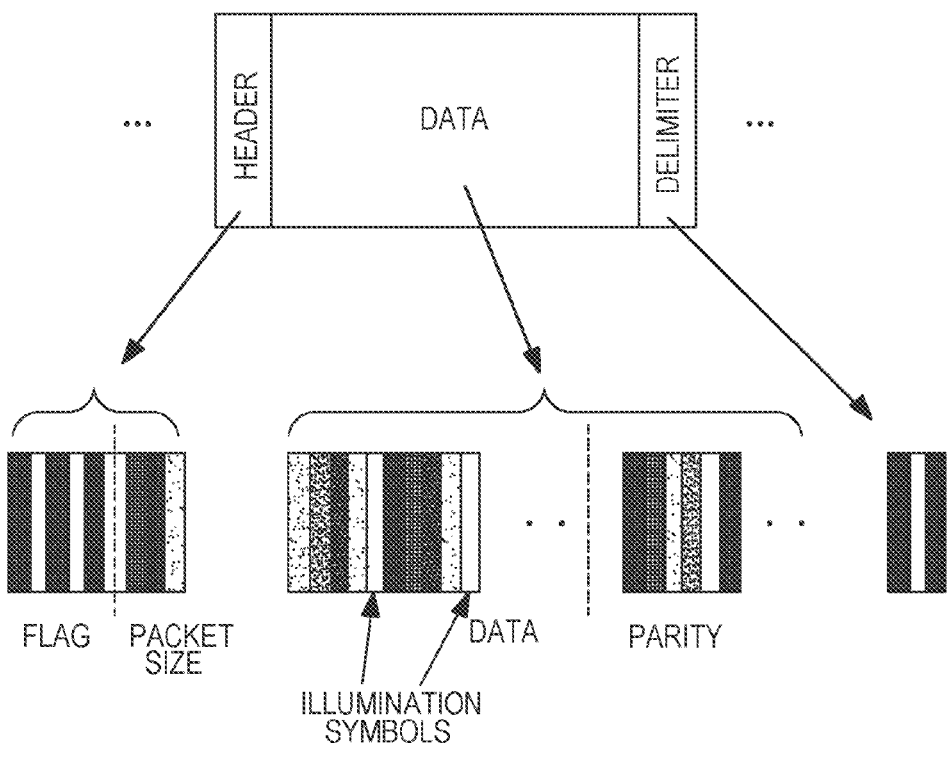
FIG. 10 illustrates a data packet structure and how it is converted into physical symbols.

FIG. 10 illustrates the data packet structure and how it is converted into physical symbols in one embodiment of the invention. In FIG. 10, each stripe represents a pulse of light of a particular colour emitted by the LED 26.

In addition, calibration packets may be generated and transmitted. Calibration packets consist of a packet flag and all the colour symbols that will be used in the data packets. They are sent out periodically to aid the receiver in correctly distinguishing received symbols. This may be necessary as different manufacturers may use different camera filters which change the colour perceived by the camera. The changes in ambient lighting may also cause the receiver to perceive colours differently.

If desired, a camera property known as the rolling-shutter effect can be used to increase the data rate by transmitting multiple symbols per frame. On the other hand, the rolling-shutter introduces an inter-frame gap, i.e. time between frames where the data is lost, which may increase the need for error correction.

The LED which is used to transmit the brushing data may be one or more of the LEDs which are used to give visual feedback to the user. For example, the LED may be one or more of the LEDs in the light ring shown in FIG. 3. This can allow an existing component to be used to transmit data, thereby saving on cost and space. However, if desired, a separate LED, such as a tri-colour LED could be used for the data transmission. In this case, the LED for data transmission is located in a different part of the housing of the toothbrush device 10 shown in FIG. 4.

If a plurality of LEDs (such as a ring of LEDs) is used to transmit the data, then each LED may transmit the same or different data. For example, space multiplexing could be used as well as colour shift keying, and/or one or more of the LEDs could be used to transmit calibration packets.

The CSK modulation scheme used may be based, for example, on that defined by the IEEE Standard for Local and metropolitan area networks 802.15.7: Short-Range Optical Wireless Communications, the subject matter of which is incorporated herein by reference.

Figure 11:
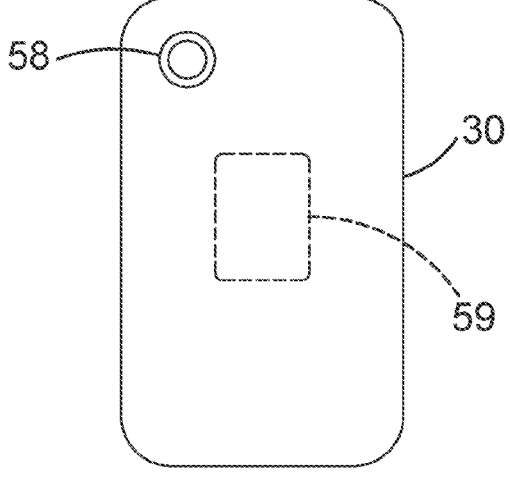
FIG. 11 shows schematically parts of a mobile device.

FIG. 11 shows schematically parts of a mobile device 30 which are used for data retrieval. Referring to FIG. 11, the mobile device comprises camera 58 and processor 59, as well as a touch screen (not shown) which is used to display images and receive inputs from the user.

Figure 12:
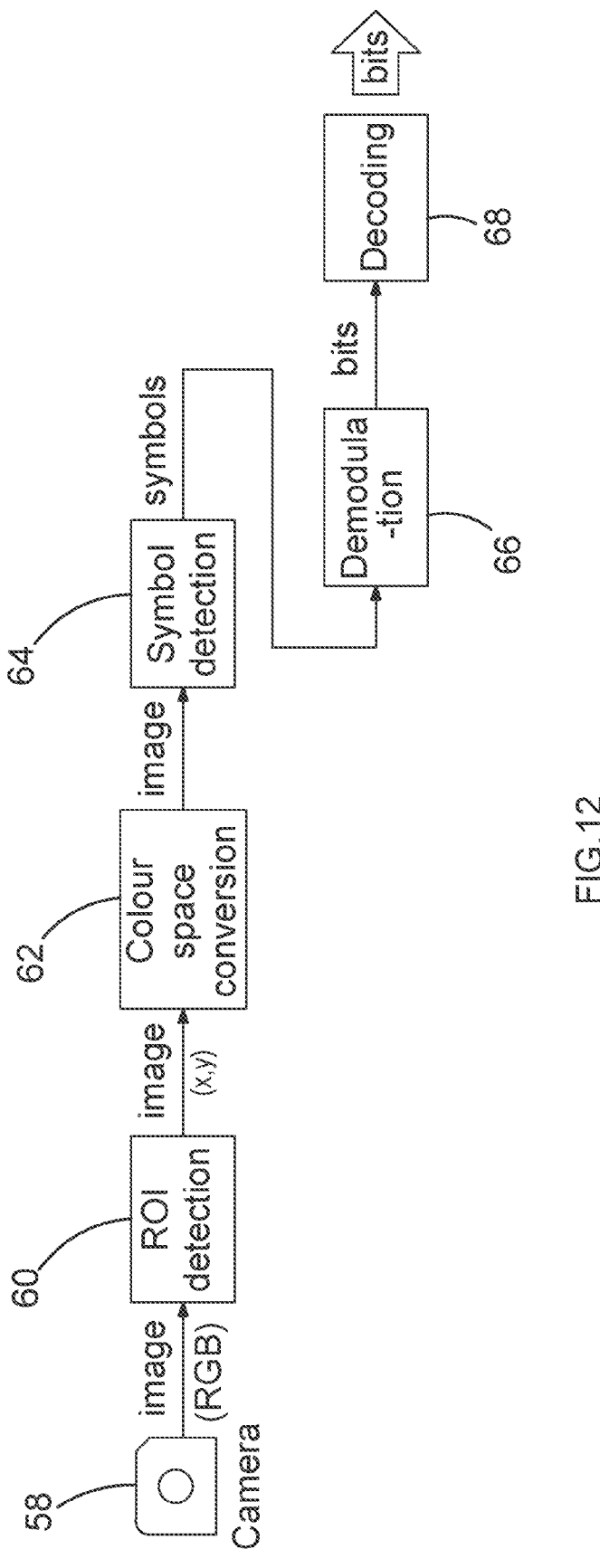
FIG. 12 shows in more detail parts of a mobile device which are used for data retrieval.

FIG. 12 shows in more detail parts of the mobile device 30 which are used for data retrieval. Referring to FIG. 12, the mobile device comprises camera 58, region of interest (ROI) detector 60, colour-space conversion module 62, symbol detection module 64, demodulation module 66 and decoding module 68. The ROI detector 60, colour-space conversion module 62, symbol detection module 64, demodulation module 66 and decoding module 68 may be implemented as an application or other software running on the device's processor 59. The camera 58 may be a camera which is built into the mobile device, and which is accessed by the software.

Data retrieval is performed on the mobile device 30 by pointing the camera 58 at the toothbrush's LED 26. The ROI detector 60 obtains RGB image frames from the camera (typically at 30 frames per second). The ROI detector 60 contains image processing algorithms which detect the region containing the LED (region of interest), for example, by identifying a sequence of CSK symbols within the image. Alternatively, the user may be required to ensure that the camera is pointed such that the LED is enclosed within a predefined region (such as a box on the screen). The images of the region of interest containing the LED are passed from the ROI detector 60 to the colour-space conversion module 62.

The colour-space conversion module 62 is used to convert the RGB images from the ROI detector 60 into CIE colour space (as defined by the International Commission on Illumination), which is better suited at removal of variations in the brightness component. The converted image is passed to the symbol detection module 64.

In the symbol detection module 64, the image is reduced to a single dimension by averaging the pixels in each pulse, to reduce the computation overhead. The colours in the image are then colour matched to the colours (symbols) from the predefined CSK constellation (included in the calibration packets). The sequences of colours are searched for packet delimiter sequences, from which the packets are reconstructed. As part of the reconstruction process 'placeholder' symbols are inserted in place of symbols lost due to inter-frame gaps. This is done because the Reed Solomon algorithm can deal with (and recover data containing) bit errors but not with data completely missing (removed at an arbitrary position). The number of symbols lost (and to be inserted) can be calculated using the length from packet length symbols and the actual number of symbols received. The frame boundary (where symbols are lost) is known. The symbols are then passed to the demodulation module 66.

There are two main sources of (bit) errors that can occur: mapping the received colour to a wrong symbol from the constellation; and losing symbols due to inter-frame gaps which are ultimately (after reconstruction) also just bit errors. Correctly designed Reed Solomon coding (ratio of error correction words to data words/chunk size) can correct all the errors in a packet and provide error free original (chunk) data. After all packets are received correctly, the integrity of the whole transmission can be confirmed with the included checksum.

For increased reliability the transmitter may be configured to continuously 'broadcast' or 'beam' the whole transmission until instructed to stop (with a button or potentially through VLC feedback from the receiver). This would allow the receiver to buffer correctly received packets and wait for (automatic) retransmission of any corrupted packets (where RS decoding failed) until all packets are decoded and the transmission integrity is confirmed.

In the demodulation module 66 the symbols are demodulated depending on the constellation design into corresponding bits. The demodulated bits are passed to the decoding module 68. Data decoding including error correction takes place in the decoding module 68 in order to reconstruct the raw data bits.

Once the raw data has been reconstructed, brushing session reports are available for presentation to the user on the mobile device and/or long-term storage in the cloud. For example, the mobile device 30 may display on its screen a representation of the mouth with different parts illuminated in colours which indicate brushing times and/or brushing pressures. This may help to provide the user with insights into their brushing behaviour.

In a CSK system such as that described above, the time-averaged light intensity transmitted by the light source is generally constant. However, the rapid changes in chromaticity can cause flickering in the light which is perceived by the user. This could lead to a bad user experience and could potentially be problematic for individuals with epilepsy.

In a variant of the system described above, steps are taken to reduce or eliminate perceived flickering of the light. This can be achieved by injecting white light at certain points in time to create the illusion of a steady white light just being on-instead of the flickering from the transmission. In one embodiment, "white" symbols (i.e. symbols which give the appearance of white light when transmitted) are injected at the appropriate times into the data to be transmitted by the light transmission module 38. The number of required white symbol injections depends on the symbol rate and decreases as the symbol rate increases. This is because the perceived colour is an average of all the symbols seen in a time frame and more symbols are likely to average to a (uniform) white colour. White symbols could be inserted uniformly at random by the transmitter after the modulation step (and removed by the receiver before demodulation). Alternatively, they could be inserted between the same and most similar (most difficult to distinguish by the receiver) symbols first, in order to simplify the symbol (boundary) detection task and decrease symbol error rate.

If desired, data could also be transmitted in the opposite direction (from the mobile device to the toothbrush device), for example, by blinking the screen of the mobile device or the built in camera flash, and detecting the blinks using a photodetector on the toothbrush device.

The toothbrush system described above can allow brushing data to be transferred from the toothbrush device to the mobile device using existing components such as the LEDs on the toothbrush device and the camera on the mobile device. This is achieved through the use of optical wireless communication techniques such as Visible Light Communication (VLC). This can allow the cost and size of the device to be reduced, in comparison to the case where radio frequency technologies such as BLE are used.

Visible light communication (VLC) also has the advantage of having over 300 THz of license free communication which is significantly larger than that available in radio communication. In addition to having less capacity, radio waves are oversubscribed which may lead to issues with interference. This may be noticeable by users, for example, when trying to connect a smart toothbrush to a mobile phone using BLE in an area where there is weak Wi-Fi connection, which is common for bathrooms. Most phones prioritize Wi-Fi over BLE, since they share a similar frequency band, which may result in loss of the BLE signal. Using VLC for data transmission helps to overcome this disadvantage.

Another advantage of using VLC technology is that it allows for greater security on local networks as light cannot pass through walls. Light waves are more secure than radio waves due to the inherent requirement for line of sight which limits the ability for interception.

Preferred features of the invention have been described above with reference to various embodiments. However, it will be appreciated that the invention is not limited to these embodiments, and variations in detail may be made within the scope of the appended claims.

The invention claimed is:

1. A toothbrush device comprising:

a motion sensor arranged to sense motion of the toothbrush device to produce motion data;

a signal analysis unit arranged to analyse the motion data to produce brushing data;

a light source arranged to provide visual feedback of brushing activity to a user; and

a light communication module arranged to transmit the brushing data to an external device using the light source, wherein the light source comprises a multi-color light emitting diode (LED) which allows different colors to be displayed depending on a state of brushing, wherein the toothbrush device is arranged to use the multi-color LED to provide the visual feedback to the user regarding the brushing activity during the brushing, and to use the multi-color LED to transmit the brushing data to the external device after the brushing, wherein the signal analysis unit is arranged to produce a summary of brushing activity during a brushing session, and wherein the light communication module is arranged to modulate chromaticity of the multi-color LED to transmit the summary of brushing activity to the external device after the brushing.

2. The toothbrush device of claim 1, wherein the multi-color LED is arranged to emit visible light.

3. The toothbrush device of claim 1, wherein the light source comprises a plurality of multi-color LEDs.

4. The toothbrush device of claim 1, wherein the light communication module is arranged to modulate the multi-color LED using color shift keying.

5. The toothbrush device of claim 1, wherein the light communication module is arranged to map data bits to colors in a predefined color constellation.

6. The toothbrush device of claim 5, wherein the toothbrush device is arranged to transmit calibration data containing the colors in the predefined color constellation.

7. The toothbrush device of claim 1, wherein the signal analysis unit is arranged to analyse the motion data to produce data indicating an area of a mouth being brushed.

8. The toothbrush device of claim 1, wherein the toothbrush device is arranged to detect an input from the user indicating that the brushing data should be transmitted, and to transmit the brushing data to the external device on detection of the input.

9. The toothbrush device of claim 1, wherein the toothbrush device comprises a plurality of multi-color LEDs each of which corresponds to an area of a mouth, and the toothbrush device is arranged to illuminate one of the plurality of multi-color LEDs when the corresponding area of the mouth has been brushed for a predetermined amount of time.

10. The toothbrush device of claim 1, wherein the light communication module is arranged to inject white light into the brushing data to be transmitted to reduce an appearance of flickering.

11. A system comprising:

a toothbrush device, the toothbrush device comprising:

a motion sensor arranged to sense motion of the toothbrush device to produce motion data;

a signal analysis unit arranged to analyse the motion data to produce brushing data;

a light source arranged to provide visual feedback of brushing activity to a user, wherein the light source comprises a multi-color light emitting diode (LED) which allows different colors to be displayed depending on a state of brushing; and

a light communication module arranged to transmit the brushing data to an external device using the multi-color LED, wherein the toothbrush device is arranged to use the multi-color LED to provide the visual feedback to the user regarding the brushing activity during the brushing, and to use the multi-color LED to transmit the brushing data to the external device after the brushing, wherein the signal analysis unit is arranged to produce a summary of brushing activity during a brushing session, and wherein the light communication module is arranged to modulate chromaticity of the multi-color LED to transmit the summary of brushing activity to the external device after the brushing; and a mobile processing device, the mobile processing device comprising:

a camera arranged to produce image data; and a processor arranged to process the image data, wherein the processor is arranged to process an image of the multi-color LED of the toothbrush device to obtain the brushing data.

12. The system of claim 11, wherein the processor is arranged to map colors in the image data to colors in a predefined color constellation to detect transmitted data.

13. The system of claim 11, wherein the processor is arranged to identify an area of interest containing the image of the multi-color LED in the image data.

14. The system of claim 11, wherein the mobile processing device is arranged to transmit the brushing data to a backend server.

15. A method of analysing brushing activity with a toothbrush device, the method comprising:

sensing motion of the toothbrush device to produce motion data;

analysing the motion data to produce brushing data;

using a light source to provide visual feedback to a user regarding brushing activity during brushing, wherein the light source is a multi-color light emitting diode (LED) which displays different colors depending on a state of brushing; and modulating the multi-color LED with the brushing data, thereby to transmit the brushing data to an external device, wherein the same multi-color LED is used to provide the visual feedback to the user regarding the brushing activity during the brushing, and to transmit the brushing data to the external device after the brushing, wherein the method comprises producing a summary of brushing activity during a brushing session, and wherein chromaticity of the multi-color LED is modulated to transmit the summary of brushing activity to the external device after the brushing.

16. The method according to claim 15, further comprising using a mobile processing device with a camera to produce an image of the multi-color LED, and processing the image to obtain the brushing data.

* * * * *